Patented July 19, 1938

2,124,070

UNITED STATES PATENT OFFICE 2,124,070

2-NAPHTHOLSULPHONIC ACIDS AND THEIR MANUFACTURE

Adolf Krebser, Riehen, near Basel, and Franco Vannotti, Basel, Switzerland, assignors to the firm J. R. Geigy S. A., Basel, Switzerland No Drawing. Application August 26, 1937, Serial No. 161,158. In Switzerland September 11, 1936

16 Claims. (Cl. 260—155)

It is known that sulphites react with diazo bodies in different ways according to the nature of the diazo-compounds and the conditions of the reaction.

In the benzene series, with neutral sulphites phenyldiazosulphonates are formed, which by further reduction for example with bisulphites are converted into phenylhydrazine-sulphonates. But with sulphurous acid, benzenesulphine-acids are formed, particularly easily in the presence of copper. According to L. Landsberg (Ber. 23, 1454) under certain conditions about 20% of benzenesulphonic acids may be obtained by the second method; it is to be supposed that these are formed from the primarily produced sulphine acids through oxidation during the working-up operations.

In the naphthalene series however in part another reaction is observed. In general hydrazines are less easily produced (see E. Fischer, Ber. 17, 372, footnote) because with acid and neutral sulphites a second reaction, the formation of azocompounds occurs more easily. In the case of certain specific naphthalene derivatives this reaction proceeds approximately quantitatively (German Patent 78,225).

The surprising observation has now been made that diazo-compounds of 1-amino-2-hydroxynaphthalenesulphonic acids when heated with neutral sulphites in aqueous solution behave quite differently. If an aqueous solution or suspension of an alkali salt of a 1-diazo-2-hydroxynaphthalenesulphonic acid is treated with neutral sulphite, compounds are formed in the first stage which can be regarded for example as diazosulphonates (I) or as addition products in the sense of Raschig (II) (Ber. 59, 859) or of Rowe (III) (C. 1931 II 997). Upon heating, nitrogen is split off, 2-hydroxynaphthalene-1-sulphonic acids (IV) being produced according to the following formulae.

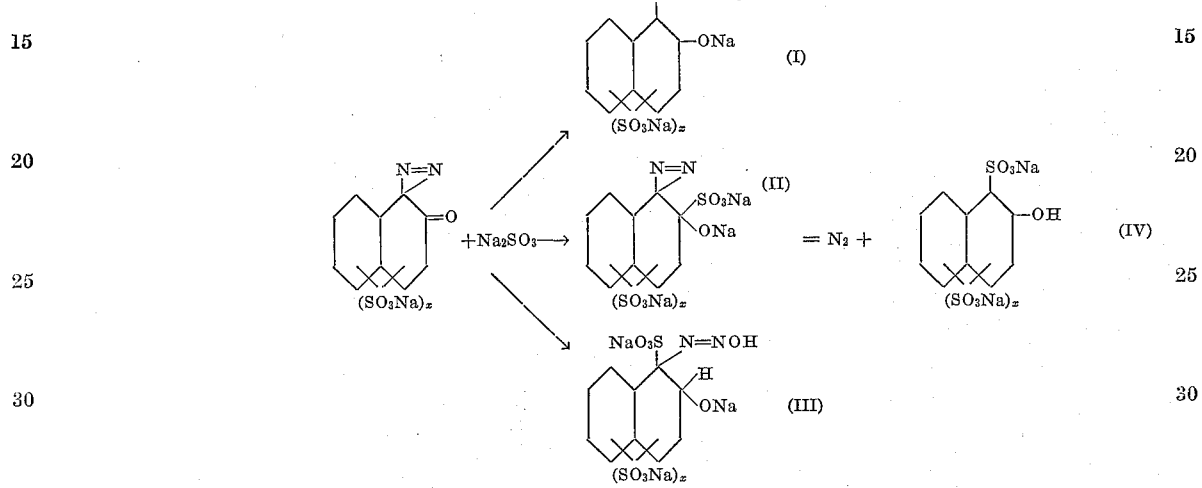

In the presence of metals, as for example Cu, Zn, Al and so forth or of metallic salts, the reaction proceeds more rapidly and uniformly.

If this new reaction is carried out with the isomeric 2-diazo-1-hydroxynaphthalenesulphonic acids it is surprisingly found that it proceeds in the manner known for naphthalene derivatives and yields varying mixtures of hydrazine- and azo-derivatives besides the corresponding 1-hydroxynaphthalenesulphonic acids.

By heating with water, with dilute mineral acids or strong organic sulphonic acids such as naphthalenesulphonic acids, if necessary under pressure, the 1-position sulphonic acid group can easily be split off without noticeable formation of by-products, the corresponding, in part also new, 2-hydroxynaphthalenesulphonic acids being produced.

The following examples illustrate the invention, the parts being by weight.

*Example 1*

1040 parts of moist 1-diazo-2-hydroxynaphthalene-4-sulphonate of sodium of 52.4% (2 molecules), obtained in the usual way according to the process of German Patent No. 171,024, are gradually added within about 2 hours to a boiling hot solution of 310 parts of sodium sulphite (93%) and 5 parts of crystalline copper sulphate in 1800 parts of water which also contains 1 part of copper dust.

Splitting off of nitrogen commences at once with strong frothing. After completion of the addition, the mass is heated to 100° C. until the splitting off of nitrogen is complete. The weakly violet colored liquid is filtered hot and made acid to Congo red with hydrochloric acid. Salted out with sodium or potassium chloride, the 2-hydroxy-naphthalene-1,4-disulphonic acid formed in approximately quantitative amount is precipitated in the form of its sodium or potassium salt. The pure alkali salts of the new acid in aqueous solution fluoresce a very weak blue and with ferric chloride yield an intense indigo-blue coloration.

The di-sodium salt crystallizes out of water in form of thin colorless needles of the composition $C_{10}H_6O_7S_2Na_2.3H_2O$.

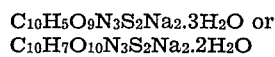

|  | | Per cent | | Per cent |
|---|---|---|---|---|
| Analysis: S | calculated | 15.95 | found | 16.05 |
| Na | do | 11.45 | do | 11.58 |
| H$_2$O | do | 13.45 | do | 14.00 |

The potassium salt crystallizes in form of large prisms.

A proof of the constitution of the new compound is given by the splitting off of the sulphonic acid group in position 1:

300 parts of 2-naphthol-1,4-disulphonic acid in the form of approximately 95% of potassium salt and 600 parts of 5% sulphuric acid are boiled under reflux for 10 hours. A quantitative yield of an approximately 20–25% solution of the known 2-naphthol-4-sulphonic acid is obtained. After neutralizing with an alkali it can for example be directly used as a coupling component for azo dyestuffs or after liming and evaporation as potassium salt, a grey crystalline powder can be isolated.

Instead of sulphuric acid, other mineral acids, such as hydrochloric acid, or strong organic acids such as for example naphthalenesulphonic acid and so forth can be used to split off the sulphonic acid group.

*Example 2*

250 parts of a 100% 1-diazo-2-hydroxynaphthalene-6-sulphonic acid in the form of its sodium salt, prepared according to German Patent No. 171,024, are suspended in 700 parts of water and, similarly to Example 1, gradually poured into 170 parts of sodium sulphite, 3 parts of crystalline copper sulphate, 1 part of copper powder and 800 parts of water at boiling temperature. After the evolution of nitrogen has ceased the further procedure of Example 1 is followed.

Apart from some 2-naphthol-6-sulphonic acid mainly the known 2-naphthol-1,6-disulphonic acid is obtained (see J. Am. Chem. Soc. 1930, 2835), the di-sodium salt of which crystallizes with 3 molecules of water. By boiling with dilute acids in the usual manner the sulphonic acid group in position 1 is again split off, Schäffer's acid (2-naphthol-6-sulphonic acid) being formed. 1-diazo-2-naphthol-4,6-disulphonic acid behaves entirely similarly.

*Example 3*

295 parts of a 100% 6-nitro-1-diazo-2-hydroxy-naphthalene-4-sulphonic acid in pressed cakes, obtained according to German Patent No. 164,665 are suspended in 1200 parts of water and treated at low temperature with a caustic soda solution until neutral to Congo red. 200 parts of sodium sulphite (93%) are now poured into the clear solution, the yellow color immediately changing to red orange. In a few minutes a thick orange-red deposit is precipitated, which consists of fine needles of the following composition:—

$C_{10}H_5O_9N_3S_2Na_2.3H_2O$ or
$C_{10}H_7O_{10}N_3S_2Na_2.2H_2O$ apparently agreeing with one of the formulae given in the introduction above.

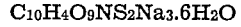

|  | | Per cent | | Per cent |
|---|---|---|---|---|
| Analysis: S | calculated | 13.49 | found | 13.50 |
| Azo-N | do | 5.89 | do | 5.91 |
| H$_2$O | do | 11.37 | do | 10.25 |

If this new body is added to boiling water, to which some sodium sulphite and copper powder or another metal or metal salt has been added, the nitrogen of the diazo group is completely split off. The same result is obtained without separation of the intermediate compound by heating the reaction mass in the presence of copper, zinc, aluminium and so forth or their salts, up to complete splitting off of nitrogen.

By salting out the brown colored reaction liquid with common salt the tri-sodium salt of 6-nitro-2-hydroxy-naphthalene-1,4-disulphonic acid is obtained in the form of orange-red prisms with 8 molecules of water of crystallization, which in the air weathers to the hexahydrate of the constitution:

$C_{10}H_4O_9NS_2Na_3.6H_2O$

|  | | Per cent | | Per cent |
|---|---|---|---|---|
| Analysis: S | calculated | 12.25 | found | 12.52 |
| Na | do | 13.0 | do | 12.56 |
| H$_2$O | do | 20.7 | do | 20.8 |
| Reduction value | do | 66.7 | do | 66.6 |

(By reduction value is to be understood the determination with nitrite after the reduction, see Fierz, Grundlegende Operationen der Farbenchemie 1924, page 250.)

Upon acidifying with the calculated quantity of acid, the di-sodium salt is produced, separating out of water in form of thin faintly yellow leaf-like lamellae having the constitution:

$C_{10}H_5O_9NS_2Na_2.2H_2O$

|  | | Per cent | Per cent |
|---|---|---|---|
| Analysis: Na | calculated | 10.72 | found 10.42 |
| H$_2$O | do | 8.45 | do 8.50 |

Theated with dilute acids under heat, the 6-nitro-2-hydroxynaphthalene-1,4-disulphonic acid through splitting off of the sulphonic acid group in the 1-position yields the known 6-nitro-2-hydroxynaphthalene-4-sulphonic acid (see for example Helv. Chim. Acta XII, 1042).

Reduction with iron according to Béchamp leads to the 6-amino-2-hydroxynaphthalene-1,4-disulphonic acid, the alkali salts of which in aqueous solution fluoresce an intense green. The neutral aqueous solution gives with ferric chloride a violet coloration which rapidly changes to green. If the soda-alkaline solution is acidified, the mono-sodium salt is precipitated, which crystallizes out of water with 1 molecule of water of crystallization:—

| Analysis: | | Per cent calculated | | Per cent found | |
|---|---|---|---|---|---|
| | S | | 17.9 | | 17.94 |
| | N | do | 3.91 | do | 3.90 |
| | Na | do | 6.42 | do | 6.63 |
| | H$_2$O | do | 5.03 | do | 5.5 |

Splitting off of the sulphonic acid group in position 1, which takes place for example by boiling with sulphuric acid of 30 per cent strength within 4 hours, leads to the known 2-amino-6-hydroxynaphthalene-8-sulphonic acid.

*Example 4*

390 parts of 6-bromo-1-amino-2-hydroxynaphthalene-4-sulphonic acid prepared according to the German Patent No. 236,656 and diazotized in the usual way, are suspended in 1000 parts of water, neutralized with cooling with caustic soda lye and treated with 160 parts of sodium sulphite (93%).

This mass is poured within 2 hours into 1000 parts of water, 140 parts of sodium sulphite (93%), 2 parts of crystalline copper sulphate and 4 parts of copper powder at boiling temperature and heated until nitrogen ceases to be evolved. The further procedure of Example 1 is then followed.

There are obtained the alkali salts of the 6-bromo-2-hydroxynaphthalene-1,4-disulphonic acid, which are very easily soluble in water and yield with ferric chloride an intense indigo-blue coloration.

The sodium salt after recrystallizing from water forms a white, crystalline powder of the constitution:

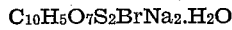

| Analysis: | | Per cent calculated | | Per cent found | |
|---|---|---|---|---|---|
| | S | | 14.3 | | 13.85 |
| | Br | do | 18.0 | do | 17.47 |
| | Na | do | 10.3 | do | 9.6 |
| | H$_2$O | do | 4.3 | do | 4.0 |

The sulphonic acid group in 1-position can easily be split off with dilute mineral acids under heat, the 6-bromo-2-hydroxynaphthalene-4-sulphonic acid being formed. Its sodium salt crystallizes out of water in the form of a light grey, crystalline powder of the constitution:

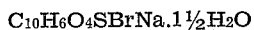

| Analysis: | | Per cent calculated | | Per cent found | |
|---|---|---|---|---|---|
| | S | | 9.1 | | 9.13 |
| | Br | do | 22.7 | do | 23.05 |
| | Na | do | 6.53 | do | 6.22 |
| | H$_2$O | do | 7.7 | do | 7.9 |

The 6-chloro-1-amino-2-hydroxynaphthalene-4-sulphonic acid of the German Patents Nos. 246,573 and 246,574 behave entirely similarly.

Instead of sodium sulphite used in the above examples, also potassium sulphite, ammonium sulphite or any other soluble sulphite can be employed.

What we claim is:

1. A process for the manufacture of 2-naphthol-sulphonic acids, consisting in heating 1-diazo-2-hydroxynaphthalene-sulphonic acid of the formula

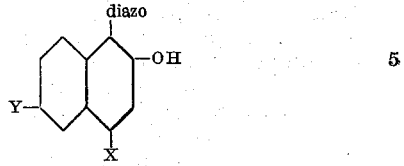

wherein X represents a member of the group consisting of H and SO$_3$H and Y represents a member of the group consisting of H, SO$_3$H, NO$_2$, Br and Cl, at least one of X and Y being a SO$_3$H-group, in the presence of water with a soluble sulphite to exchange the diazo-group for the sulphonic acid group and eliminating the thus introduced SO$_3$H-group in position 1 by heating in aqueous solution.

2. A process for the manufacture of 2-naphthol-sulphonic acids, consisting in heating 1-diazo-2-hydroxy-naphthalene-sulphonic acid of the formula

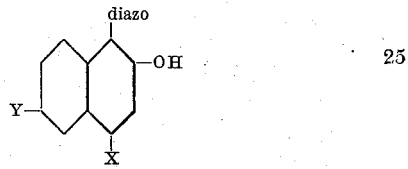

wherein X represents a member of the group consisting of H and SO$_3$H and Y represents a member of the group consisting of H, SO$_3$H, NO$_2$, Br and Cl, at least one of X and Y being a SO$_3$H-group, in the presence of water with a sulphite selected from the group of alkali-metal and ammonium-sulphites to exchange the diazo-group for the sulphonic acid group and eliminating the thus introduced SO$_3$H-group in position 1 by heating in aqueous acid solution.

3. A process for the manufacture of 2-naphthol-sulphonic acids, consisting in heating 1-diazo-2-hydroxynaphthalene-sulphonic acid of the formula

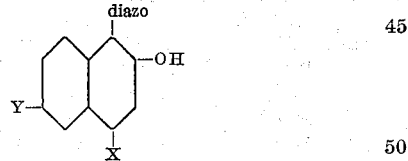

wherein X represents a member of the group consisting of H and SO$_3$H and Y represents a member of the group consisting of H, SO$_3$H, NO$_2$, Br and Cl, at least one of X and Y being a SO$_3$H-group, in the presence of water with a sulphite selected from the group of alkali-metal and ammonium-sulphites to exchange the diazo-group for the sulphonic acid group and eliminating the thus introduced SO$_3$H-group in position 1 by heating in a dilute strong mineral acid.

4. A process for the manufacture of 2-naphthol-sulphonic acids, consisting in heating 1-diazo-2-hydroxynaphthalene-sulphonic acid of the formula

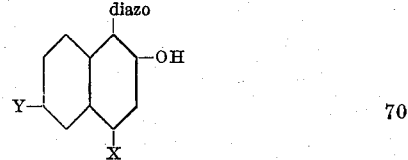

wherein X represents a member of the group consisting of H and SO$_3$H and Y represents a member of the group consisting of H, SO$_3$H, NO$_2$, Br and Cl, at least one of X and Y being a SO₃H-group, in the presence of water and a metal selected from the group consisting of Cu, Zn, Al and a soluble inorganic acid salt thereof with a soluble sulphite to exchange the diazo-group for the sulphonic acid group and eliminating the thus introduced SO₃H-group in position 1 by heating in aqueous solution.

5. A process for the manufacture of 2-naphtholsulphonic acids, consisting in heating 1-diazo-2-hydroxynaphthalene-sulphonic acid of the formula

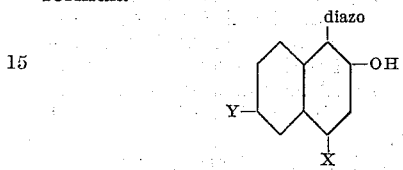

wherein X represents a member of the group consisting of H and SO₃H and Y represents a member of the group consisting of H, SO₃H, NO₂, Br and Cl, at least one of X and Y being a SO₃H-group, in the presence of water and a metal selected from the group consisting of Cu, Zn, Al and a soluble inorganic acid salt thereof with a sulphite selected from the group of alkali-metal and ammonium-sulphites to exchange the diazo-group for the sulphonic acid group and eliminating the thus introduced SO₃H-group in position 1 by heating in aqueous acid solution.

6. A process for the manufacture of 2-naphtholsulphonic acids, consisting in heating 1-diazo-2-hydroxynaphthalene-sulphonic acid of the formula:

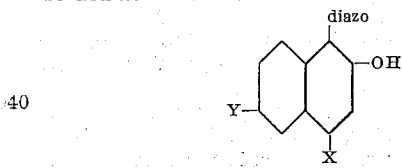

wherein X represents a member of the group consisting of H and SO₃H and Y represents a member of the group consisting of H, SO₃H, NO₂, Br and Cl, at least one of X and Y being a SO₃H-group, in the presence of water and a metal selected from the group consisting of Cu, Zn, Al and a soluble inorganic acid salt thereof with a sulphite selected from the group of alkali-metal and ammonium-sulphites to exchange the diazo-group for the sulphonic acid group and eliminating the thus introduced SO₃H-group in position 1 by heating in a dilute strong mineral acid.

7. A process for the manufacture of 2-naphthol-sulphonic acids, consisting in heating 1-diazo-2-hydroxynaphthalene-sulphonic acid of the formula

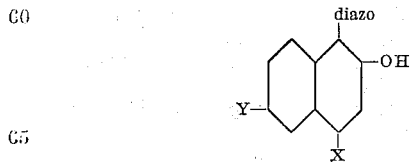

wherein X represents a member of the group consisting of H and SO₃H and Y represents a member of the group consisting of H, SO₃H, NO₂, Br and Cl, at least one of X and Y being a SO₃H-group, in the presence of water and a metal selected from the group consisting of Cu, Zn, Al and a soluble inorganic acid salt thereof with a soluble sulphite to exchange the diazo-group for the sulphonic acid group.

8. A process for the manufacture of 2-naphtholsulphonic acids, consisting in heating 1-diazo-2-hydroxynaphthalene-sulphonic acid of the formula

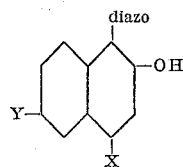

wherein X represents a member of the group consisting of H and SO₃H and Y represents a member of the group consisting of H, SO₃H, NO₂, Br and Cl, at least one of X and Y being a SO₃H-group, in the presence of water and a metal selected from the group consisting of Cu, Zn, Al and a soluble inorganic acid salt thereof with a sulphite selected from the group of alkali-metal and ammonium-sulphites to exchange the diazo-group for the sulphonic acid group.

9. A process for the manufacture of 2-naphtholsulphonic acids, consisting in heating 1-diazo-2-hydroxynaphthalene-sulphonic acid of the formula

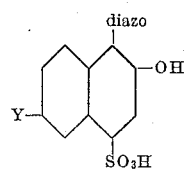

where Y respresents a member of the group consisting of H, SO₃H, NO₂, Br and Cl in the presence of water with a sulphite selected from the group of alkali-metal and ammonium sulphites and of a metal selected from the group of Cu, Zn, Al and a soluble inorganic acid salt thereof to exchange the diazo-group for the sulphonic acid group and eliminating the thus introduced SO₃H-group in position 1 by heating in a dilute strong mineral acid solution.

10. A process for the manufacture of 2-naphthol-1,4-disulphonic acid, consisting in heating 1-diazo-2-hydroxynaphthalene-4-sulphonic acid in the presence of water with sodium sulphite, copper and copper sulphate to exchange the diazo-group for the sulphonic acid group.

11. A process for the manufacture of 6-nitro-2-naphthol-1,4-disulphonic acid, consisting in heating 6-nitro-1-diazo-2-hydroxynaphthalene-4-sulphonic acid in the presence of water with sodium sulphite, copper and copper sulphate to exchange the diazo-group for the sulphonic acid group.

12. A process for the manufacture of 6-amino-2-naphthol-1,4-disulphonic acid, consisting in heating 6-nitro-1-diazo-2-hydroxynaphthalene-4-sulphonic acid in the presence of water with sodium sulphite, copper and copper sulphate to exchange the diazo-group for the sulphonic acid group and reducing the nitro-compound to the corresponding amino-compound.

13. The 2-naphthol-1,4-disulphonic acids of the formula

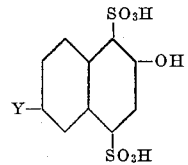

wherein Y represents a member of the group consisting of H, SO₃H, NO₂, NH₂, Br and Cl, the alkali salts of which are colorless to orange-red colored crystalline compounds, easily soluble in water.

14. The 2-naphthol-1,4-disulphonic acid, the di-sodium salt of which is in form of colorless thin needles, easily soluble in water, the aqueous solutions fluorescing a very weak blue and giving with ferric chloride an intense indigo-blue coloration.

15. The 6-nitro-2-naphthol-1,4-disulphonic acid, the tri-sodium salt of which is in form of orange-red prisms, the di-sodium salt in form of thin faintly yellow lamellae, both easily soluble in water.

16. The 6-amino-2-naphthol-1,4-disulphonic acid, the colorless sodium salt of which is easily soluble in water, the aqueous solution fluorescing an intense green and giving with ferric chloride a violet coloration turning rapidly to green.

ADOLF KREBSER.
FRANCO VANNOTTI.